Figure 1:
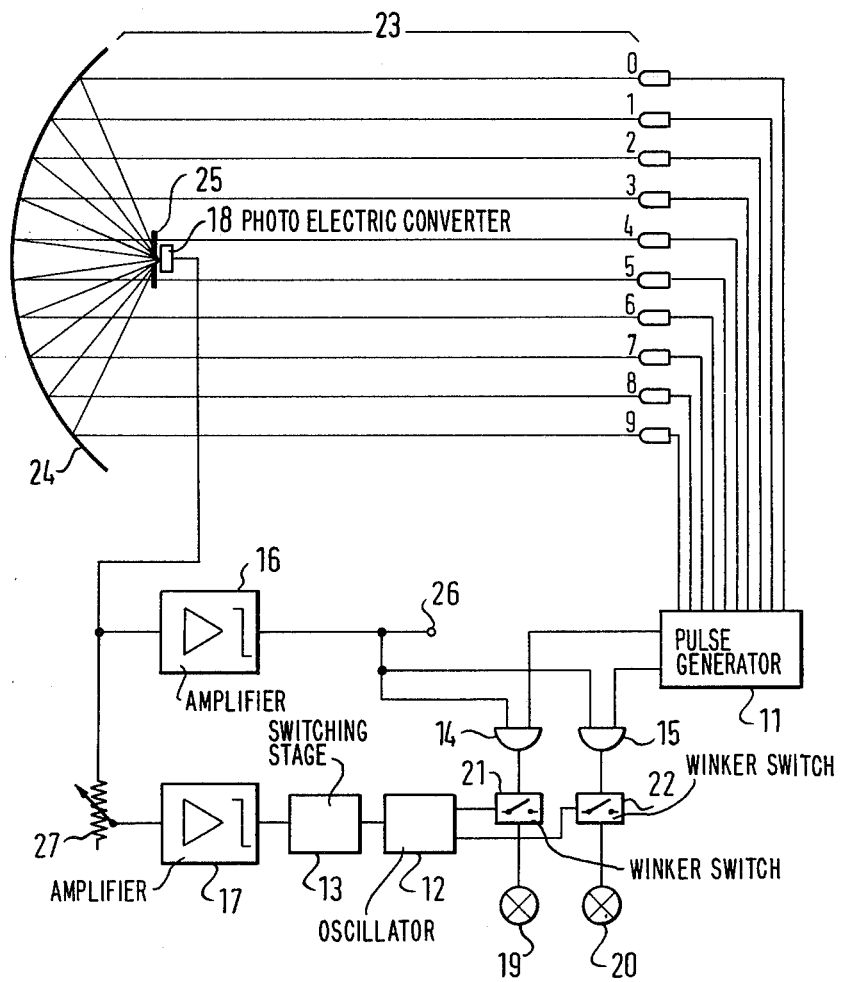

United States Patent [19]

Erdmann et al.

[11] 4,291,977
[45] Sep. 29, 1981

[54] ADJUSTMENT DEVICE FOR ALIGNING A GROUP OF CYCLICALLY SWITCHED LIGHT TRANSMITTERS OR RECEIVERS WITH A SINGLE LIGHT RECEIVER OR TRANSMITTER

[75] Inventors: Jürgen Erdmann; Walter von Stein, both of Waldkirch, Fed. Rep. of Germany

[73] Assignee: Erwin Sick GmbH Optik-Elektronik, Waldkirch, Fed. Rep. of Germany

[21] Appl. No.: 41,993

[22] Filed: May 24, 1979

[30] Foreign Application Priority Data

Jun. 2, 1978 [DE] Fed. Rep. of Germany ....... 2824311

[51] Int. Cl.³ ............................................. G01B 11/26
[52] U.S. Cl. .................................. 356/152; 307/360; 340/366 B; 356/141; 356/400
[58] Field of Search ................... 356/1, 141, 152, 375, 356/400; 340/366 B, 336, 360; 307/360

[56] References Cited

U.S. PATENT DOCUMENTS

| 3,012,469 | 12/1961 | Clayborne | 356/400 |
| 3,628,868 | 12/1971 | Starkey | 356/152 |
| 3,723,003 | 3/1973 | Vockenhuber et al. | 356/4 |
| 3,781,111 | 12/1973 | Fletcher et al. | 356/5 |
| 3,849,769 | 11/1974 | Chiba | 340/366 B |
| 4,040,738 | 8/1977 | Wagner | 356/1 |

FOREIGN PATENT DOCUMENTS

| 862590 | 3/1961 | United Kingdom | 356/152 |
| 502361 | 4/1976 | U.S.S.R. | 356/152 |

Primary Examiner—S. C. Buczinski

[57] ABSTRACT

An adjustment device for aligning a group of cyclically switched transmitters or receivers with a single receiver or transmitter of the kind in which a series of spatially spaced beams pass between the transmitters and the receiver, or alternatively between the transmitter and the receivers. In a preferred form the adjustment device is used to ensure alignment of a row of infra-red transmitters which direct beams of light to a photoelectric converter arranged at the focus of a concave mirror. The adjustment device features a coincidence circuit the outputs from which indicate that signals transmitted from the end transmitters of the row are received at the photoelectric converter. The outputs are used to energize respective adjustment indicating lamps. In a particularly preferred arrangement threshold circuitry is used to produce winking of the lamps when approximate adjustment has been achieved; continuous lighting of the lamps shows that accurate adjustment is present. The lamps can conveniently be placed adjacent their associated transmitters.

13 Claims, 7 Drawing Figures

ADJUSTMENT DEVICE FOR ALIGNING A GROUP OF CYCLICALLY SWITCHED LIGHT TRANSMITTERS OR RECEIVERS WITH A SINGLE LIGHT RECEIVER OR TRANSMITTER

The invention relates to an adjustment device for aligning a group of cyclically switched light transmitters, or receivers with a single light receiver, or transmitter, of the kind in which a series of spatially spaced beams, hereinafter referred to as a light grid, pass between the transmitters and the receiver, or alternatively between the transmitters and the receivers.

The problem of producing an alignment of this kind arises for example with light grids in which the transmitters can for example comprise ten individual gallium-arsenide diodes which are arranged in a row one above the other and which produce light in the infrared spectrum and which thus cannot be aligned with a receiver using the naked eye. The receiver can for example comprise a concave mirror and a photoelectric converter arranged at the focal point of the mirror. In light grids of this kind it is important that the gallium-arsenide diodes, which can for example be ten in number, are aligned with relatively small tolerances on the photoelectric converter via the concave mirror i.e. so that all of the ten transmitted rays can be united exactly at the focal point of the concave mirror. The gallium-arsenide diodes are then cyclically switched one after the other so that a pulse train of constant frequency is achieved at the output of the single photoelectric converter.

The adjusting device of the present invention is thus principally intended for use with light grids which utilize light or electromagnetic radiation outside of the visable spectrum. The use of the adjustment device is however not restricted to a group of cyclically switched light transmitters and a cooperating concave mirror and photoelectric converter. The light receiver can also comprise individual collimators arranged one above the other and which are either provided with respective photoelectric converters or are jointly coupled to a single photoelectric converter by means of light conducting fibres. The optical arrangement of transmitters and receivers can also be inverted. Light can thus be radiated from a light source arranged at the focal point of the concave mirror and individual receiving collimators arranged in a line in the ray path from the concave mirror can receive the beams of light radiated therefrom and concentrate these on respective photoelectric converters. If the photoelectric converters are switched in one after the other then a continuous train of pulses of constant frequency can likewise be achieved.

As the alignment between transmitter and receiver cannot be optically monitored when using light outside of the visable spectrum the invention is based on the problem of providing an adjustment device in which, for a light grid, a troublefree alignment is possible between transmitter and receiver.

This is achieved in accordance with the invention in that the signals of the single light receiver, or transmitter, and the transmitted, or received, signals of at least one element of the group are passed to a coincidence circuit which is followed by at least one adjustment indicating means. A preferred embodiment is characterized in that the transmitted or received signals from two elements of the group are respectively passed to one input of respective AND-gates which together form the coincidence circuit, the signals of the single light receiver or transmitter being applied to the other inputs of the AND-gates and in that the outputs of the AND-gates respectively control adjustment indicating lamps or other adjustment indicating devices.

The invention makes especial use of the recognition that, for correct individual adjustment of the individual elements of the group of light transmitters or receivers, troublefree adjustment between transmitter and receiver is present if at least one element, however preferably two elements, of the group is/are correctly aligned. In the latter case both elements of the group should preferably lie spatially as far apart from each other as possible in order to achieve a good accuracy of adjustment. By displacement of the transmitter or the receiver it can be arranged that both indicating devices, especially adjustment lamps, are simultaneously activated or lit up.

If the group of cyclically switched transmitters or receivers lie in a row along a line then the signals of the first and last elements are usefully connected to the AND-gates. An adjustment can be effected by vertical displacement or tilting of e.g. the transmitters relative to the receiver until both adjustment lamps light up.

When this occurs the optimum adjustment has been found.

In order to guarantee that a certain quantity of light is in every case present at the receiver the signal from the light receiver (or transmitter) can be applied in accordance with a third embodiment to the AND-gates via an amplifier having a first threshold value so that both adjustment lamps light up only when the chosen signals exceed the specified threshold.

The adjustment is then further simplified if the signal of the single light receiver (or transmitter) is in addition applied to a second amplifier having a second higher switching threshold which is connected via a switching stage to an oscillator of very low frequency, for example in the range 3 to 5 Hz, which actuates winker switches arranged between the AND-gates and the adjustment lamps when the switching stage detects a pulse which lies beneath the threshold value. In this manner a winking signal at one or both of the indicating lamps indicates, following an insufficient first preliminary adjustment, that the threshold of the first amplifier has been exceeded but not however that of the second amplifier. The optimum adjustment is only present when the relative position of the transmitter and receiver is further adjusted by tilting and vertical displacement until the winking signal changes to a continuous signal.

It is especially advantageous if the adjustment lamps are each arranged directly adjacent their associated light transmitter (or receiver) as then an optical impression of the correct adjustment is brought about by lighting up or extinction or the adjustment lamps.

Figure 2:
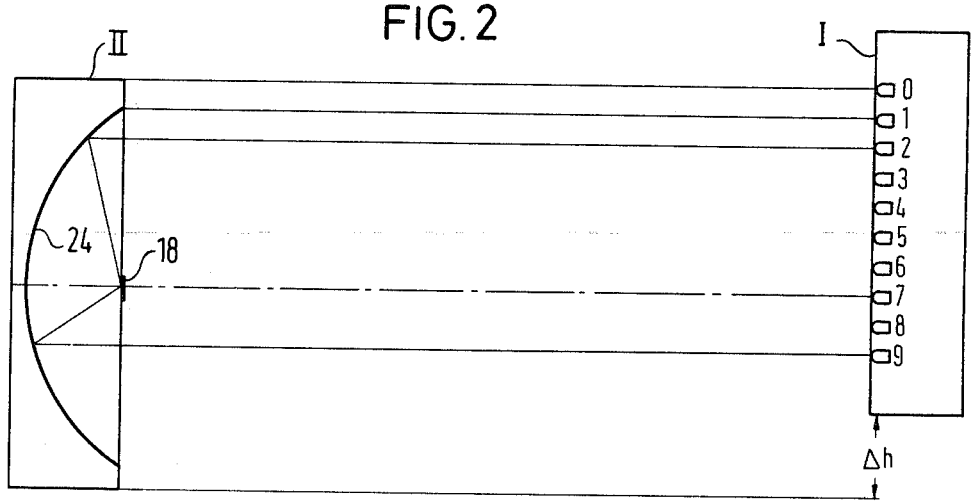
Figure 3:
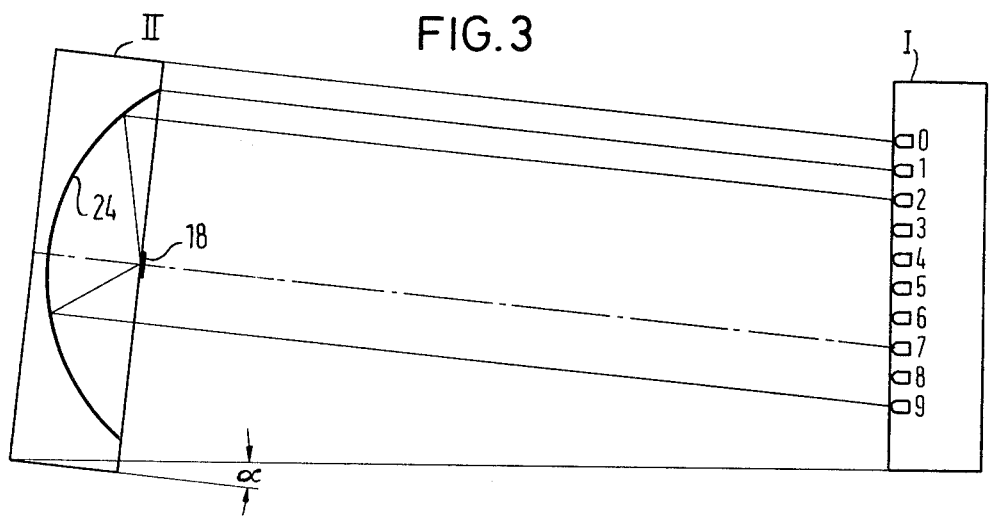
Figure 4:
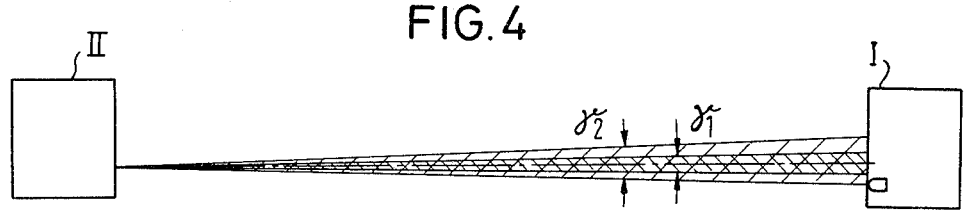
Figure 5:
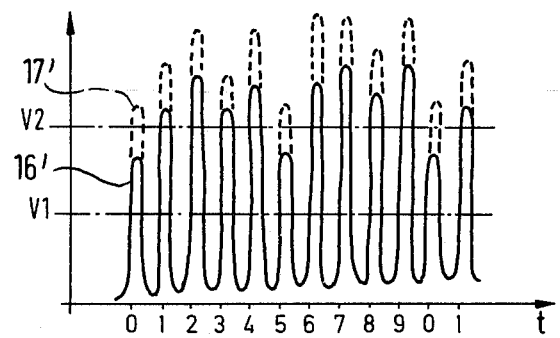
Figure 6:
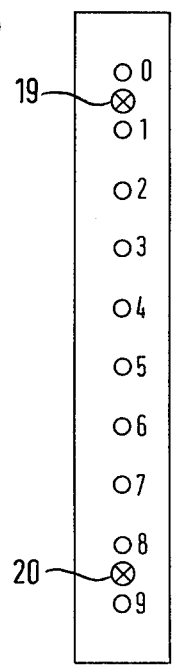

The invention will now be described in more detail in the following by way of example only and with reference to the drawings in which are shown:

FIG. 1 a schematic illustration of a transmitter formed by an arrangement of ten gallium-arsenide diodes and a receiver formed by a concave mirror and a photoelectric converter in which the electronic processing circuit is shown as a block diagram, FIG. 2 the optical arrangement of FIG. 1 is shown vertically mal-adjusted, FIG. 3 the optical arrangement of FIG. 1 is shown angularly mal-adjusted, FIG. 4 a plan view of the optical arrangement of FIG. 1 for the purpose of illustrating a change of the field of view, FIG. 5 a time dependent plot of the receiver output signal showing the two amplifier threshold values in accordance with the present invention and FIG. 6 a front view of a group of light transmitters with two associated adjustment lamps.

As seen in FIG. 1 ten radiation sources in the form of gallium-arsenide diodes 0 to 9 are arranged along a line and direct their light through a space 23 to be monitored towards a concave mirror 24. A single photoelectric convertor 18 is arranged at the focal point of the mirror behind a slotted aperture stop 25.

The gallium-arsenide diodes 0 to 9 are cyclically excited to produce light flashes using a ring counter with a pulse generator 11. Thus an electrical square wave pulse output signal of predetermined frequency appears at the output of the photoelectric convertor 18. If something enters the space 23 being monitored one or more of the output pulses from the photoelectric converter will be missing. The pulse train is passed via an amplifier 16 having a first low threshold value to an output 26 to which a known electronic monitoring circuit can be connected which produces a warning signal if one or more pulses is missing from the pulse train.

For the purposes of adjustment the output signal of the amplifier 16 is in addition applied to respective inputs of two AND-gates 14 and 15 and signals derived from the receivers 0 and 9 which originate from the ring counter 11 are respectively passed to the other inputs of the AND-gates. If desired signals from other transmitters than the end ones 0 and 9 can alternatively be applied to the relevant inputs of the AND-gates 14, 15.

Preferably however the signals from the outermost transmitters 0 and 9 are so applied.

The outputs of the AND-gates 14, 15 are applied via normally closed controlled switches 21, 22 to adjustment indicating lamps 19, 20.

Together with the lighting up of the radiation sources 0 and 9 input signals will be present at the respective inputs to the AND-gates 14 and 15. If the radiation sources 0 and 9 are not correctly aligned relative to the photoconvertor 18 then the other two inputs of the AND-gates 14 and 15 do not receive signals and the adjustment lamps 19 and 20 do not light up. If however a signal appears at the photoconverter 18 as one or both of the transmitters lights up, then input signals appear at both inputs of the AND-gates 14 and 15 and the thus formed output signal of the AND-gates causes the relevant indicating lamp or lamps 19 or 20 to light up.

FIG. 2 shows how vertical displacement between the transmitter 1 and the receiver 2 results in light from the transmitter 0 failing to reach the receiving photoelectric convertor 18. By displacement of the receiver II upwardly by the amount $\Delta h$ the mal-adjustment can be removed. At the beginning of this displacement the adjustment lamp 19 is not lit. Lighting up of the adjustment lamp 19 is a sign which indicates correct adjustment.

FIG. 3 shows how the light from the transmitter 0 can pass by the receiver II due to a tilting of the receiver II through the angle $\alpha$ relative to the transmitter I. In this case the adjustment lamp 19 likewise does not light up and only the adjustment lamp 20 will receive an output signal from the gate 15. By tilting of the receiver through the angle $\alpha$ the adjustment lamp 19 can also be made to light up which is once more a sign which indicates correct adjustment.

FIG. 4 illustrates how the scattered cone of light corresponding to the aperture $\gamma 2$ of the receiver makes the adjudication of the exact alignment or focussing easier as, when using an amplifier with a relatively low threshold response, the scattered light alone is sufficient to indicate an approximate alignment so that the accurate adjustment corresponding to the aperture $\gamma 1$ of the corresponding brighter central cone can accurately and quickly take place.

Finally a second amplifier 17 is additionally shown in FIG. 1 which has a controllable response threshold V2 adjustable via a potentiometer 27. This amplifier 17 first produces an output signal when the received signal at the receiving detector 18 is much stronger than that necessary at the amplifier 16 which has a lower response threshold V1. These two response thresholds V1 and V2 are illustrated in FIG. 5.

The amplifier 17 is connected via a switching stage 13 and an oscillator 12 which has a frequency in the range from 3 to 5 Hz to two winker switches 21 and 22 which are connected in the path from the AND-gates 14 and 15 to the adjustment lamps 19 and 20.

The switching stage 13 is so arranged that, if a single pulse from the train of pulses brought about by the transmitters 0 to 9 is missing at the output of the amplifier 17 then the oscillator 12 will be switched on and the signal to the adjustment lamps 19, 20 is periodically interrupted via the switches 21, 22. Thus a winking signal is present to the extent that the adjustment of the transmitters 0 and 9 is sufficiently advanced that both transmitters produce a signal at the output of the amplifier 16. This is illustrated by the received signal 16′ shown in dotted lines in the diagram of FIG. 5. Every pulse of this signal 16 does indeed exceed the lower threshold V1 of the amplifier 16 however the pulses 0 and 5 are not able to exceed the higher threshold V2.

Only through a better alignment between the transmitter I and the receiver II does the signal at the convertor 18 become sufficiently strong that it takes on the shape 17′ illustrated in broken lines in FIG. 5. All pulses now exceed the threshold V2 so that winking of the lamps 19 and 20 ceases and the steady illumination of these lamps indicates an optimum adjustment. The double stage adjustment using the amplifiers 16 and 17 is useful for safer operation of the device as the better adjustment means a higher degree of contamination or dirtying of the optics can be tolerated.

FIG. 6 shows an especially useful arrangement in which the adjustment lamps 19 and 20 are arranged directly adjacent the associated light transmitters 0 and 9.

If desired adjusting lamps can be associated with further light ray sources or individual receivers.

It will be appreciated by those skilled in the art that although the preferred adjustment indicating devices are lamps it would also be possible to use for example an acoustic signalling system. In this case it is desirable to use acoustic signallers with different tones so as to be able to distinguish which acoustic signal is associated with which transmitter or receiver and thus to establish which form of mal-adjustment is present and requires correction.

It will be further appreciated that whilst the adjustment device herein described in particularly suitable for use with a system operating in the infra-red region it could also be used for similar systems operating in other parts of the electromagnetic spectrum. It if for example contemplated that occasions may arise in which even a system operating in the visible spectrum cannot be conveniently adjusted by eye and it may they be desirable to use a system similar to that herein described.

Whilst the circuitry as specifically described is directed to an arrangement utilising a plurality of transmitters and a single receiver it will be understood that no particular difficulty exists in modifying the arrangement for operation with a single transmitter and a plurality of receivers. In particular it will still be possible in similar fashion to use threshold circuits to distinguish between partial and accurate adjustment. The modified threshold circuitry could either be achieved by using an amplifier with a negative gain to alternate the signal derived from the signal transmitter or alternatively by amplifying the signals derived from the receivers.

Furthermore whilst the foregoing has been described in relation to a linear array of transmitters or receivers it will be appreciated that the present teaching can equally be applied to matrices of the same.

What we claim is:

1. An adjustment device for aligning a group of cyclically switched transmitters with a single receiver, the beams radiated from said group of cyclically switched transmitters defining a grid in space, the adjustment device comprising means for passing signals representative of the operation of at least two transmitters of said group to first inputs of respective AND-gates and output signals from said light receiver via a first amplifier having a first threshold value to second inputs of said AND-gates, whereby to detect coincidence between the operation of said at least two transmitters and the generation of an output signal at said receiver, adjustment indicating means responsive to the outputs from said AND-gates to indicate the state of adjustment of said group relative to said receiver, means for passing output signals from said receiver to a second amplifier having a second threshold value higher than said first threshold value, and wherein the output of said second amplifier is applied to circuit means adapted to produce periodic variation of signals from said adjustment indicating means on the occurrence of an output signal at said receiver below said second threshold.

2. An adjustment device according to claim 1, and in which said circuit means comprises a switching stage responsive to the output of said second amplifier to actuate an oscillator having a very low frequency of operation for producing corresponding periodic fluctuation of said signals from said adjustment indicating means via switches respectively connected between the outputs of said AND-gates and the associated adjustment indicating means.

3. An adjustment device according to claim 2, and in which said adjustment indicating means comprises an adjustment indicating light source in respect of each of said at least two transmitters.

4. An adjustment device in accordance with claim 3, and in which said adjustment indicating light sources are arranged directly alongside the associated transmitters.

5. An adjustment device according to claim 1, and in which said group of cyclically switched transmitters lie along a line, and wherein the signals from the first and last transmitters of said group are passed to said AND-gates.

6. An adjustment device according to claim 1, and in which said group of transmitters operate in the infra-red spectrum.

7. An adjustment device according to claim 3, and in which each said adjustment indicating light source comprises a lamp.

8. An adjustment device according to claim 1, and in which said adjustment indicating means comprises in respect of each transmitter a respective adjustment indicating source of sound, the tones of the individual sound sources being different from each other.

9. An adjustment device for aligning a transmitter with a receiver, the adjustment device comprising means for passing output signals from said receiver and signals representative of the operation of said transmitter to coincidence circuit means adapted to produce an output indicative of coincidence between the operation of said transmitter and the generation of output signals at said receiver, adjustment indicating means adapted to receive said output from said coincidence means to produce an adjustment indicating signal, a first threshold circuit having a first threshold value adapted to pass only signals lying above said first threshold value from said receiver to said adjustment indicating means, means for passing said output signals to a second threshold circuit having a second threshold value greater than said first threshold value and adapted to produce, via associated circuit means, periodic variation of the signal from said adjustment indicating means when said output signals lie below said second threshold.

10. An adjustment device in accordance with claim 9, and in which said first and second threshold circuits are first and second threshold amplifiers.

11. An adjustment device in accordance with claim 9, and in which said adjustment indicating means comprises at least one adjustment indicating light source.

12. An adjustment device in accordance with claim 9, and in which at least one of said transmitter and said receiver comprises a plurality of transmitter and receiver devices.

13. An adjustment device for aligning a transmitter with a receiver, the adjustment device comprising means for passing output signals from said receiver and signals representative of the operation of said transmitter to coincidence circuit means adapted to produce an output indicative of coincidence between the operation of said transmitter and the generation of output signals at said receiver, adjustment indicating means adapted to receive said output from said coincidence means to produce an adjustment indicating signal, a first threshold circuit having a first threshold value adapted to pass only signals lying above said first threshold value from said receiver to said adjustment indicating means, means for passing said output signals to a second threshold circuit having a second threshold value greater than said first threshold value and adapted to produce, via associated circuit means, a modified signal from said adjustment indicating means when said output signals lie below said second threshold.

* * * * *